(12) United States Patent
Summerhays et al.

(10) Patent No.: US 11,972,464 B2
(45) Date of Patent: Apr. 30, 2024

(54) CUMULATIVE INCREMENTALITY SCORES FOR EVALUATING THE PERFORMANCE OF MACHINE LEARNING MODELS

(71) Applicant: Maplebear Inc., San Francisco, CA (US)

(72) Inventors: Daniel Summerhays, San Francisco, CA (US); Ramasubramanian Balasubramanian, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 168 days.

(21) Appl. No.: 17/752,800

(22) Filed: May 24, 2022

(65) Prior Publication Data

US 2023/0385886 A1 Nov. 30, 2023

(51) Int. Cl.
*G06Q 30/0601* (2023.01)
*G06N 5/022* (2023.01)

(52) U.S. Cl.
CPC ......... *G06Q 30/0601* (2013.01); *G06N 5/022* (2013.01)

(58) Field of Classification Search
USPC ....................................................... 705/26.1
See application file for complete search history.

(56) References Cited

U.S. PATENT DOCUMENTS

| | | | | |
|---|---|---|---|---|
| 7,158,943 | B2* | 1/2007 | van der Riet | G06Q 30/0269 705/26.1 |
| 7,818,208 | B1* | 10/2010 | Veach | G06Q 30/0257 705/14.54 |
| 10,467,659 | B2* | 11/2019 | Chalasani | G06N 7/01 |
| 10,511,681 | B2* | 12/2019 | Modarresi | G06N 3/08 |
| 11,043,208 | B1 | 6/2021 | Michelin et al. | |
| 11,216,850 | B2* | 1/2022 | Peris | G06Q 30/0246 |

(Continued)

FOREIGN PATENT DOCUMENTS

WO    WO 2022/010772 A1    1/2022

OTHER PUBLICATIONS

Cadmus, J., "Measured Helps Marketers Understand Media Contribution with New Incrementality Calculator: Free Tool Predicts Financial Impact of Making Shifts in Budget Across Media Channels," PR Newswire [New York] Jun. 23, 2020. (Year: 2020).*

(Continued)

*Primary Examiner* — Nicholas D Rosen
(74) *Attorney, Agent, or Firm* — Fenwick & West LLP

(57) ABSTRACT

An online concierge system uses a cumulative incrementality score to evaluate the performance of incrementality models used by the online concierge system to identify users for treatment. The online concierge system applies an incrementality model to a set of examples to generate predicted incrementality scores for the examples. The online concierge system ranks the examples based on the predicted incrementality scores for the examples and groups the examples based on their rankings. The online concierge system iteratively computes cumulative incrementality scores for each grouping based on the examples of each grouping, and computes a final cumulative incrementality score for the incrementality model based on each of the cumulative incrementality scores.

20 Claims, 9 Drawing Sheets

(56) References Cited

U.S. PATENT DOCUMENTS

| | | | |
|---|---|---|---|
| 11,443,367 B2* | 9/2022 | Conant, II | G06Q 30/0645 |
| 11,556,773 B1* | 1/2023 | Aggarwal | G06Q 30/0242 |
| 2003/0126146 A1* | 7/2003 | Van Der Riet | G06Q 30/0211 |
| 2013/0290094 A1* | 10/2013 | Srivastava | G06Q 30/0245 |
| | | | 705/14.44 |
| 2015/0100423 A1* | 4/2015 | Oldham | G06Q 30/0256 |
| | | | 705/14.54 |
| 2017/0330274 A1* | 11/2017 | Conant, II | G06F 16/9537 |
| 2018/0040032 A1* | 2/2018 | Chalasani | G06Q 30/0243 |
| 2019/0273789 A1* | 9/2019 | Modarresi | H04L 67/55 |
| 2021/0035163 A1* | 2/2021 | Peris | G06Q 30/0243 |
| 2021/0209633 A1 | 7/2021 | Podgorny et al. | |
| 2021/0326233 A1 | 10/2021 | Bao et al. | |
| 2021/0406838 A1 | 12/2021 | Ramanath et al. | |

OTHER PUBLICATIONS

PCT International Search Report and Written Opinion, PCT Application No. PCT/US2023/66954, dated Nov. 9, 2023, 18 pages.

* cited by examiner

CUMULATIVE INCREMENTALITY SCORES FOR EVALUATING THE PERFORMANCE OF MACHINE LEARNING MODELS

BACKGROUND

Online systems, such as online concierge systems, may apply a treatment to a user. A treatment is an action that the online concierge system may take with regards to a user to encourage the user to interact with the online concierge system. In some cases, the treatment is targeted to cause the user to perform a target action. For example, an online system may notify a user of new content that is available on the online system to encourage the user to interact with the online system. The online systems may use machine learning models to identify these users, since applying the treatment to every user of the online system may use excessive resources of the online system and may actually negatively impact the rate at which users interact with the online system.

Machine-learning models are commonly evaluated using metrics that can quantify the performance of the machine-learning model. However, conventional metrics often identify the performance of the machine-learning model over the full range of its predictions. While these metrics may work for some machine-learning models, for incrementality models that predict the likelihood that a treatment will cause a user to perform a target action, it is typically more important for the model to perform well at the high end of the prediction score range, than it is to perform well across the full range of prediction scores. This is because treatments tend to only cause a user to perform a target action in a relatively small set of cases, and therefore it is generally more important to identify those relatively small set of cases, than it is to properly identify the cases where a treatment will not cause a user to perform the target action. Thus, incrementality machine-learning models that use conventional machine-learning metrics require additional resources of the online system applying treatments to users for whom a treatment will not change the user's actions (e.g., because the user was already going to perform the target action or because the user would not perform the target action even if treated).

SUMMARY

In accordance with one or more aspects of the disclosure, an online concierge system uses a cumulative incrementality score to evaluate the performance of incrementality models and to select incrementality models that are best suited for selecting users for the application of treatments. An incrementality model is a machine learning model that is trained to generate predicted incrementality scores for users based on user data describing characteristics of those users. Predicted incrementality scores represent a likelihood that applying a treatment to a user will cause the user to perform a target action. Incrementality models may be trained as classifiers with training examples of users in a target class and training examples of users that are not in the target class. The target class of users are users who have been treated with the treatment and have performed the target action, and users who have not been treated and have not performed the target action.

The online concierge system computes a cumulative incrementality score for an incrementality model based on a set of examples. The examples include user data for users of the online concierge system and labels indicating whether each user has been treated and whether the user has performed a target action. The online concierge system computes a cumulative incrementality score for the incrementality model by applying the incrementality model to each of the examples and ranking the examples based on the generated predicted incrementality scores. The online concierge system groups the examples based on their predicted incrementality scores and their rankings and iteratively computes cumulative incrementality scores for each grouping. The online concierge system may compute a final cumulative incrementality score for the incrementality model based on the cumulative incrementality scores for each of the groupings.

By using a cumulative incrementality score to evaluate incrementality models, the online concierge system reduces the computational resources used to apply treatments to users by ensuring that the incrementality models are more targeted in which users they apply treatments to. Specifically, the online concierge system ensures that treatments are applied to users that are more likely to be caused to perform a target action by treating the user, and therefore increases the likelihood that the online concierge system only treats users in appropriate circumstances.

DETAILED DESCRIPTION

Environment of an Online Concierge System

Figure 1:
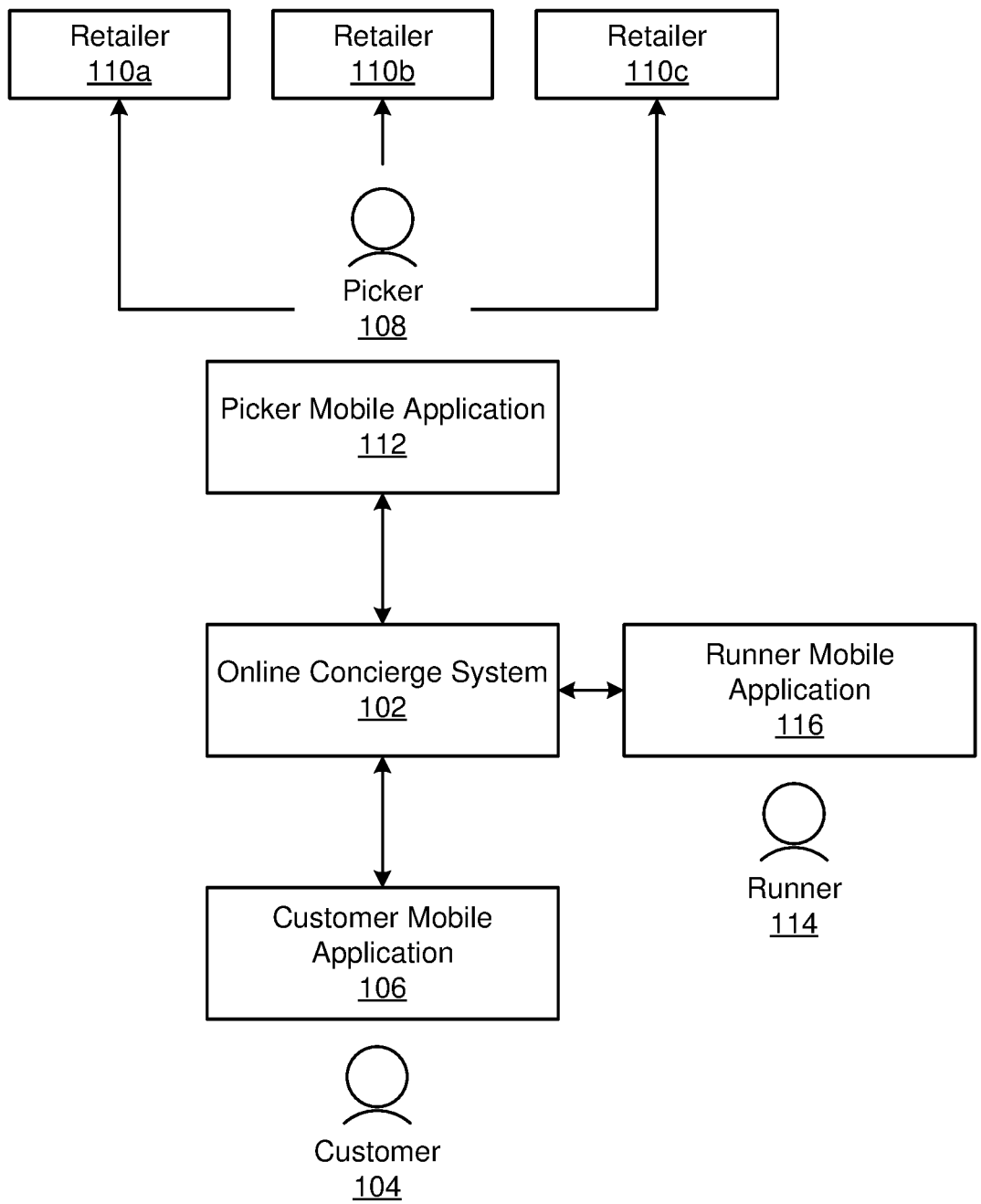
FIG. 1 illustrates the environment of an online concierge system, in accordance with some embodiments.

FIG. 1 illustrates an example system environment 100 of an online concierge system 102, according to some embodiments. The system environment 100 illustrated in FIG. 1 includes an online concierge system 102, a customer 104, a customer mobile application 106, a picker 108, one or more retailers 110, a picker mobile application 112, a runner 114 and a runner mobile application 116. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Additionally, the figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The online concierge system 102 is configured to receive orders from one or more customers 104 (only one is shown for the sake of simplicity). An order specifies a list of goods or products to be delivered to the customer 104. Goods, items, and products may be used synonymously herein to mean any item that a customer 104 can purchase via the online concierge system. The order also specifies the location to which the goods are to be delivered, and a time window during which the goods should be delivered. In some embodiments, the order specifies one or more retailers from which the selected items should be purchased. The customer may use a customer mobile application (UMA) 106 to place the order; the UMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The environment 100 also includes three retailers 110a, 110b, and 110c (only three are shown for the sake of simplicity; the environment could include any number of retailers). The retailers 110 may be physical retailers, such as grocery stores, discount stores, department stores, etc., or non-public warehouses storing items that can be collected and delivered to customers. Each picker 108 fulfills an order received from the online concierge system 102 at one or more retailers 110, delivers the order to the customer 104, or performs both fulfillment and delivery. In some embodiments, pickers 108 make use of a picker mobile application 112 which is configured to interact with the online concierge system 102.

Online Concierge System

Figure 2:
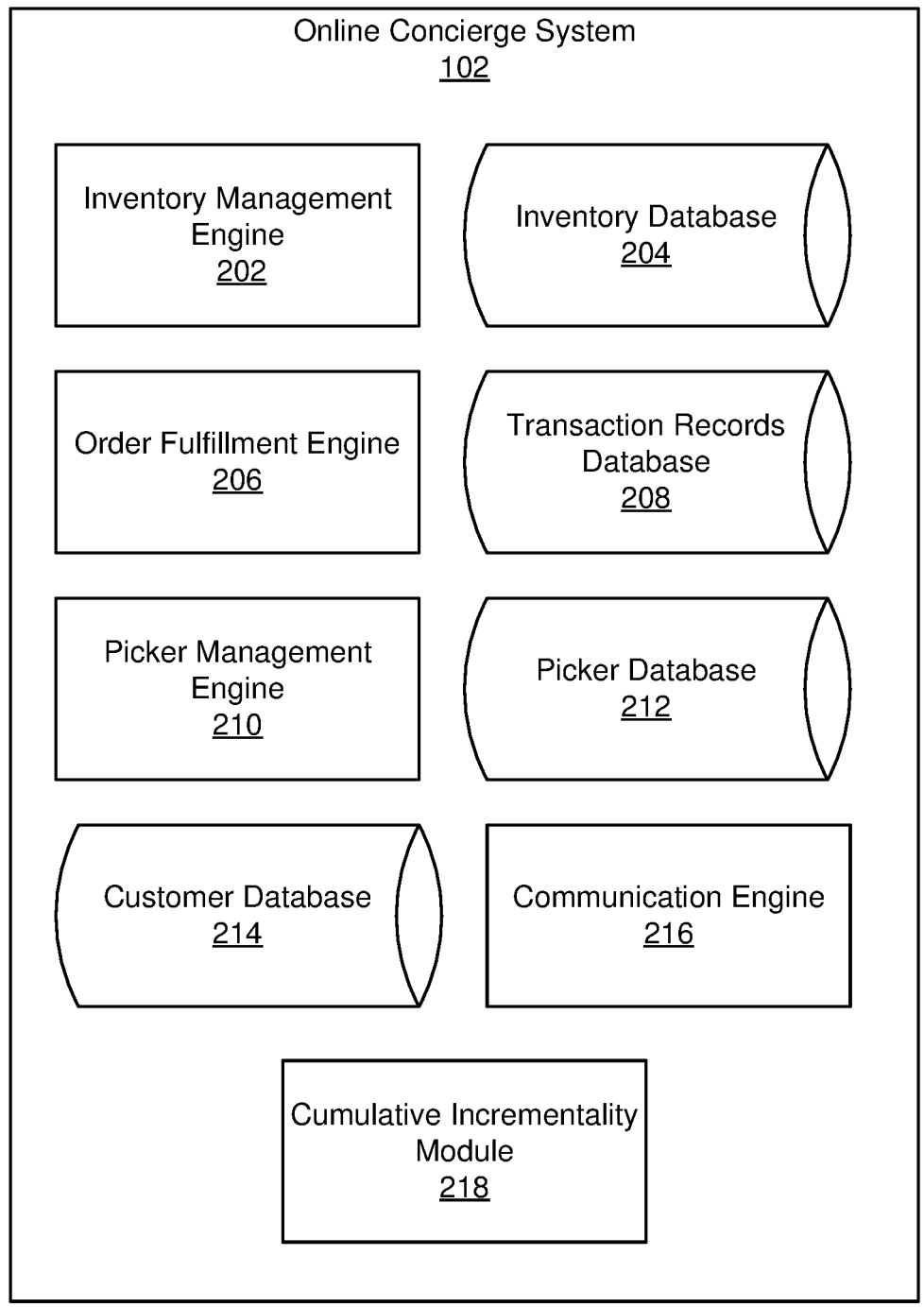
FIG. 2 is a block diagram of an online concierge system, in accordance with some embodiments.

FIG. 2 is a block diagram of an online concierge system 102, according to some embodiments. The online concierge system illustrated in FIG. 2 includes an inventory management engine 202, an inventory database 204, an order fulfillment engine 206, a transaction records database 208, a picker management engine 210, a picker database 212, a customer database 214, a communications engine 216, and a cumulative incrementality module 218. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The online concierge system 102 includes an inventory management engine 202, which interacts with inventory systems associated with each retailer 110. In some embodiments, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information includes both qualitative and quantitative information about items, including size, color, weight, SKU, serial number, and so on. In some embodiments, the inventory database 204 also stores purchasing rules associated with each item, if they exist. For example, age-restricted items such as alcohol and tobacco are flagged accordingly in the inventory database 204.

In some embodiments, the inventory database 204 stores product embeddings for products offered for sale on the online concierge system 102. A product embedding is an embedding that describes a product. The product embeddings may be associated with specific products stored by the inventory database 204. For example, each brand of a product may have an individual product embedding, or products may have different product embeddings for each retailer that sells the product. Alternatively, each product embedding may be associated with a generic product, and each generic product is associated with specific products that are similar or substitutes of each other. For example, the inventory database 102 may store a product embedding for the generic product "milk", and the specific products of "Moo Moo 2% Milk" and "Greener Pastures Organic Whole Milk" may both be associated with the product embedding for "milk."

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which retailers 110. The order fulfillment engine 206 determines a sale price for each item ordered by a customer 104. Prices set by the order fulfillment engine 206 may or may not be identical to in-store prices determined by retailers (which is the price that customers 104 and pickers 108 would pay at retailers). The order fulfillment engine 206 also facilitates transactions associated with each order. In some embodiments, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with retailer 110. For example, after successful fulfillment of an order, the order fulfillment engine 206 may transmit a summary of the order to the appropriate retailer. The summary may indicate the items purchased, the total value of the items, and in some cases, an identity of the picker 108 and customer 104 associated with the transaction. In some embodiments, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In some embodiments, the picker management engine 210 receives a new order from the order fulfillment engine 206. The picker management engine 210 identifies the appropriate retailer 110 to fulfill the order based on one or more parameters, such as the contents of the order, the inventory of the retailers, and the proximity to the delivery location. The picker management engine 210 then identifies one or more appropriate pickers 108 to fulfill the order based on one or more parameters, such as the pickers' proximity to the appropriate retailer 110 (and/or to the customer 104), his/her familiarity level with that particular retailer 110, and so on. Additionally, the picker management engine 210 accesses a picker database 212 which stores information describing each picker 108, such as his/her name, rating, previous shopping history, and so on. The picker management engine 210 transmits the list of items in the order to the picker 108 via the picker mobile application 112. The picker database 212 may also store data describing the sequence in which the pickers' picked the items in their assigned orders.

As part of fulfilling an order, the order fulfillment engine 206 and/or picker management engine 210 may access a customer database 214 which stores information describing each customer. This information could include each customer's name, address, gender, shopping preferences, favorite items, stored payment instruments, and so on.

The online concierge system 102 may use a communication engine 216 that transmits information between the customer mobile application 106, the picker mobile application 112, and the runner mobile application 116. The information may be sent in the form of messages, such as texts or emails, or notifications via application, among other forms of communication. The communication engine 216 may receive information from each application about the status of an order, the location of a customer in transit, issues with items in an order, and the like. The communication engine 216 determines a message or notification to send to a customer 104, picker 108, or runner 114 based on this information and transmits the notifications to the appropriate application. For example, the online concierge system 102 may receive information from the customer mobile application 106 indicating that a customer 104 is traveling to the pickup location to retrieve an order. Based on this information, the communication engine 216 sends a notification to the runner mobile application 116 indicating that the customer 104 associated with a specific order is in transit, which may incite the runner 114 to retrieve the order for pick up. In another example, the online concierge system 102 may receive a message from the picker mobile application 112 that an item of an order is not available. The communication engine 216 may transmit the message to the customer mobile application 106 associated with the order.

The cumulative incrementality module 218 computes cumulative incrementality scores to evaluate the performance of incrementality models. These cumulative incrementality scores represent the effectiveness of the incrementality model in identifying users for whom a treatment will cause the user to perform a target action. The cumulative incrementality module 218 uses the incrementality models to identify users for the application of treatments to users. The cumulative incrementality module 218 may receive user data describing the characteristics of users of the online concierge system 102, and may apply the incrementality models to determine which users are mostly likely to be caused to perform a target action by applying a candidate treatment to those users. The functionality of the incrementality models and the cumulative incrementality module 218 is described in further detail below.

Figure 3A:
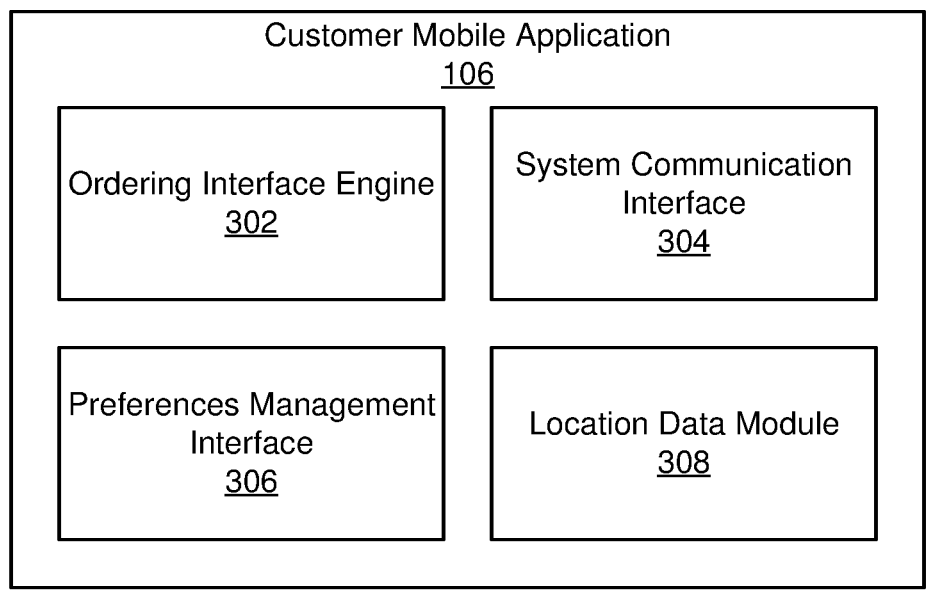
FIG. 3A is a block diagram of the user mobile application (UMA), in accordance with some embodiments.

FIG. 3A is a block diagram of the customer mobile application (UMA) 106, according to some embodiments. The UMA 106 illustrated in FIG. 3A includes an ordering interface engine 302, a system communication interface 304, a preferences management interface 306, and a location data module 308. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The customer 104 accesses the UMA 106 via a client device, such as a mobile phone, tablet, laptop, or desktop computer. The UMA 106 may be accessed through an app running on the client device or through a website accessed in a browser. The UMA 106 includes an ordering interface 302, which provides an interactive interface with which the customer 104 can browse through and select products and place an order. The ordering interface 302 also may include a selected products list that specifies the amounts and prices of products that the customer 104 has selected to order. The customer 104 may review the selected products list and place an order based on the selected products list. Furthermore, the ordering interface 302 may present recipes to the customer 104 that the online concierge system 102 predicts the customer 104 is attempting to complete, and may provide an option to the customer 104 to add additional products needed to complete a recipe to the customer's selected products list.

Customers 104 may also use the ordering interface 302 to message with pickers 108 and runners 114 and receive notifications regarding the status of their orders. The UMA 106 also includes a system communication interface 304 which, among other functions, receives inventory information from the online concierge system 102 and transmits order and location information to the online concierge system 102. The UMA 106 also includes a preferences management interface 306 which allows the customer 104 to manage basic information associated with his/her account, such as his/her home address and payment instruments. The preferences management interface 306 may also allow the customer to manage other details such as his/her favorite or preferred retailers 110, preferred handoff times, special instructions for handoff, and so on.

The UMA 106 also includes a location data module 308. The location data module 308 may access and store location data related to a client device associated with a customer 104 via the customer mobile application 106. Location data may include the geographic location of the client device associated with the customer mobile application 106, how fast the client device is travelling, the average speed of the client device when in transit, the direction of travel of the client device, the route the customer 104 is taking to a pickup location, current traffic data near the pickup location, and the like. For simplicity, the location of a customer client device or client device may be referred to as the location of the customer throughout this description. The customer 104 may specify whether or not to share this location data with the customer mobile application 106 via the preferences management interface 306. If a customer 104 does not allow the customer mobile application 106 to access their location data, the location data module 308 may not access any location data for the customer 104. In some embodiments, the customer 104 may specify certain scenarios when the location data module 308 may receive location data, such as when the customer 104 is using the customer mobile application 106, any time, or when the customer 104 turns on location tracking in the customer mobile application 106 via an icon. The customer 104 may also specify which location data the location data module 308 may retrieve, and which location data is off-limits. In some embodiments, the location data module 308 may be tracking the customer's 104 location as a background process while the UMA 106 is in use. In other embodiments, the UMA 106 may use real-time location data from the location data module 308 to display a map to the customer 104 indicating their current location and the route to a pickup location for their order.

Figure 3B:
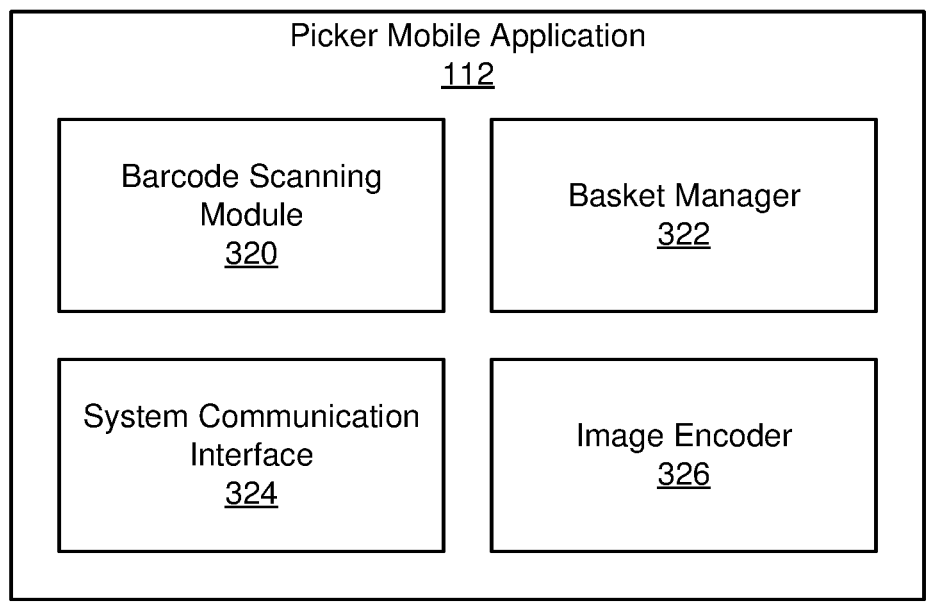
FIG. 3B is a block diagram of the picker mobile application (PMA), in accordance with some embodiments.

FIG. 3B is a block diagram of the picker mobile application (PMA) 112, according to some embodiments. The PMA 112 illustrated in FIG. 3B includes a barcode scanning module 320, a basket manager 322, a system communication interface 324, and an image encoder 326. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The picker 108 accesses the PMA 112 via a mobile client device, such as a mobile phone or tablet. The PMA 112 may be accessed through an app running on the mobile client device or through a website accessed in a browser. The PMA 112 includes a barcode scanning module 320 which allows a picker 108 to scan an item at a retailer 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 also includes a basket manager 322 which maintains a running record of items collected by the picker 108 for purchase at a retailer 110. This running record of items is commonly known as a "basket". In some embodiments, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

The PMA 112 also includes a system communication interface 324, which interacts with the online concierge system 102. For example, the system communication interface 324 receives information from the online concierge system 102 about the items of an order, such as when a customer updates an order to include more or less items. The system communication interface may receive notifications and messages from the online concierge system 102 indicating information about an order. The system communication interface transmits notifications and messages to be displayed via a user interface of the mobile device associated with the PMA 112.

Figure 3C:
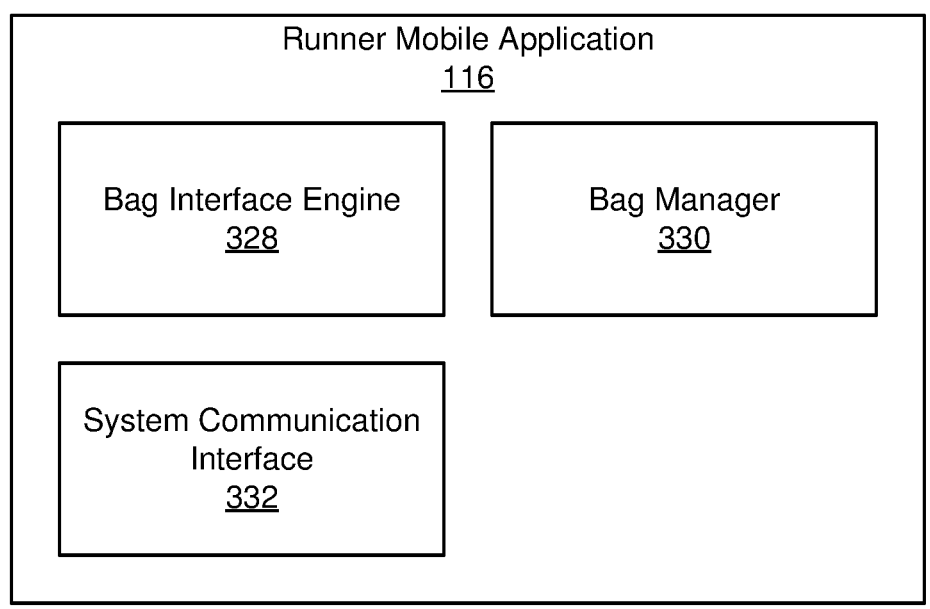
FIG. 3C is a block diagram of the runner mobile application (RMA), in accordance with some embodiments.

FIG. 3C is a block diagram of the runner mobile application (RMA) 116, according to some embodiments. The RMA 116 illustrated in FIG. 3C includes a bag interface engine 328, a bag manager 330, and a system communication interface 332. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The runner 114 accesses the RMA 116 via a client device, such as a mobile phone, tablet, laptop, or desktop computer. The RMA 116 may be accessed through an app running on the client device or through a website accessed in a browser. The RMA 116 includes bag interface engine 328, which provides an interactive interface with which the runner 114 can view orders they need to deliver and the locations of the bags for each order, such as on a particular shelf or in a refrigerator of a pickup location. The runner 114 may receive notifications through the bag interface engine 328 about new orders, the location of a customer 104 who is in transit to a pickup location, and new orders to deliver. The runner 114 may also receive communications via the bag interface engine 328 with customers regarding order handoff and pickup confirmation and may interact with the interface generated by the bag interface engine 328 to send communications to customers and the online concierge system 102 regarding order status. For example, a runner 114 may send the customer a pickup spot at the pickup location to meet for order handoff and indicate that an order has been delivered to a customer via the interface, which ends the wait time calculation by the location data module 308 associated with the customer.

The RMA 116 includes a bag manager 330 that manages the assignment of orders to runners 114 and the locations of bags for each order. The RMA 116 also includes a system communication interface 332 which, among other functions, receives inventory information from the online concierge system 102 and transmits order and bag information to the online concierge system 102. The system communication interface may also receive notifications and messages from the online concierge system 102 indicating information about an order. The system communication interface transmits notifications and messages to be displayed via a user interface of the mobile device associated with the RMA 116.

Example Cumulative Incrementality Module

Figure 4:
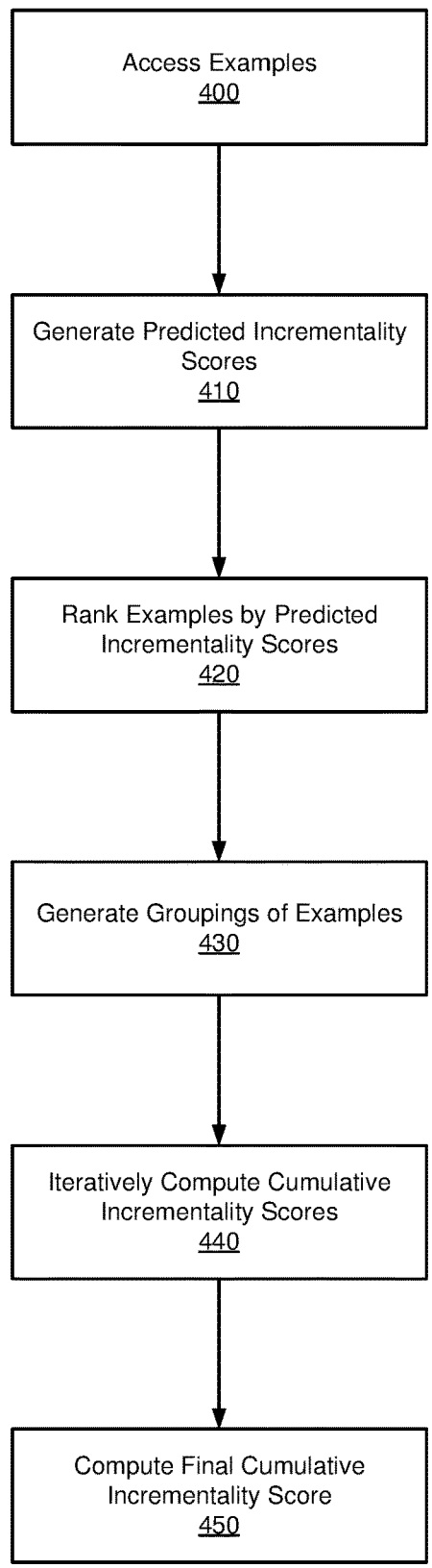
FIG. 4 is a flowchart illustrating an example method for computing a cumulative incrementality score for an incrementality model, in accordance with some embodiments.

FIG. 4 is a flowchart illustrating an example method for computing a cumulative incrementality score for an incrementality model, in accordance with some embodiments. Alternative embodiments may include more, fewer, or different steps from those illustrated in FIG. 4, or may perform the steps in a different order from that illustrated. Additionally, the steps may be performed automatically by a cumulative incrementality module of a computer system (such as the cumulative incrementality module 218 of FIG. 2) with or without human interaction or instruction.

A cumulative incrementality module accesses 400 a set of examples used to compute the cumulative incrementality score for an incrementality model. An example represents one or more interactions of a user with the online concierge system, and contains information that the cumulative incrementality module uses to generate cumulative incrementality scores for an incrementality model. Each example includes user data describing a user of the online concierge system. A user may be a customer, a picker, or a runner. The user data may describe a user's interactions with the online concierge system, such as when the user has interacted with the online concierge system, what kinds of interactions the user has with the online concierge system, how often the user interacts with the online concierge system, or characteristics of the user's interactions with the online concierge system. Additionally, the user data may describe demographic or personal information about the user, such as the user's name, age, gender, sex, income, contact information, location, or residence. In some embodiments, the cumulative incrementality module accesses user data from a customer database 214, a picker database 212, an inventory database 204, or a transaction records database 208 of the online concierge system.

Additionally, each example includes a treatment label and an action label. A treatment label for an example indicates whether the user of the example has been treated with a treatment. A treatment is an action that the online concierge system may take with regards to a user to encourage the user to interact with the online concierge system. A treatment may include a custom-generated message. For example, for a customer user, a treatment may include notifying the user of a new product, sending a message to the user encouraging the user to submit an order, sending a coupon to the user, offering the user a temporary or permanent discount on orders, offering the user a free product, or offering to reduce or eliminate fees on a user's purchase. Similarly, for a picker user or a runner user, a treatment may include notifying the user of a possible order for servicing, offering the user an additional service fee for servicing an order from another user, offering a temporary or permanent increase in a service fee or commission paid to the user for servicing orders, or offering a reward to the user for servicing a certain number of orders within a time period. For convenience, an example whose user has been treated with a treatment may be referred to as a "treated example" or "example that has been treated." Similarly, an example whose user has not been treated with a treatment may be referred to as an "untreated example" or "example that has not been treated."

An action label for an example indicates whether a user of the example has performed a target action associated with the treatment. A target action is an interaction that is targeted by the online concierge system for the user to perform. For example, a target action may be for a user to place an order with the online concierge system or to service an order for the online concierge system. For convenience, an example whose user has performed the target action may be referred to as an "acted example" or "example that has performed the target action." Similarly, an example whose user has not performed the target action may be referred to as an "unacted example" or "example that has not performed the target action."

The treatment label and the action label may be independent of each other, meaning that an example's treatment label that indicates whether the user has been treated is independent of the example's action label that indicates whether the user has performed the target action. Thus, there are four categories of examples: treated, acted examples; treated, unacted examples; untreated, acted examples; and untreated, unacted examples.

The cumulative incrementality module generates 410 predicted incrementality scores for each of the examples. A predicted incrementality score is a score that represents a likelihood that applying the treatment to a user will cause the user to perform a target action associated with the treatment. The predicted incrementality scores may be generated by applying an incrementality model to each of the examples. An incrementality model is a machine learning model (e.g., a neural network) that is trained to generate predicted incrementality scores based on user data. The incrementality model, in accordance with some embodiments, is described in further detail below with regards to FIG. 7.

As noted above, a predicted incrementality score is a score that represents a likelihood that applying a treatment to a user will cause the user to perform a target action associated with the treatment. This may be described herein as the treatment "causing" the user to perform the target action. This causation does not include compelling or requiring the user to perform the target action. Instead, the treatment "causes" the user to perform the target action means that the treatment produced, directly or indirectly, the effect of the user performing the target action. For example, where the treatment is a notification of a new item available on the online concierge system, the treatment may "cause" the user to perform the target action of adding the new item to an order by informing the user of an item they were not aware of before. Similarly, a treatment of a discount on an order may "cause" the user to place an order they were not originally planning to place because the user wants to take advantage of the discount.

Additionally, as described herein, the treatment "causes" the target action when the user would not have otherwise performed the target action had the treatment not been applied to the user. For example, if a user would not have performed the target action if left untreated but would perform the target action if treated, then the treatment causes the user to perform the target action. However, if the user would have performed the target action regardless of whether the user is treated, then the treatment did not cause the user to perform the target action, because the user would have performed the target action anyways.

The cumulative incrementality module ranks 420 the examples by their predicted incrementality scores and generates 430 a set of groupings of the examples. Each grouping of examples is a subset of the accessed examples. The groupings are generated based on the rankings of the examples, and contain examples associated with a range of predicted incrementality scores. The range of predicted incrementality scores for each grouping may be determined based on percentile ranges of examples in the rankings (e.g., each grouping has a decile of the examples) or may be based on a range of predicted incrementality scores for all of the examples.

Figure 8:
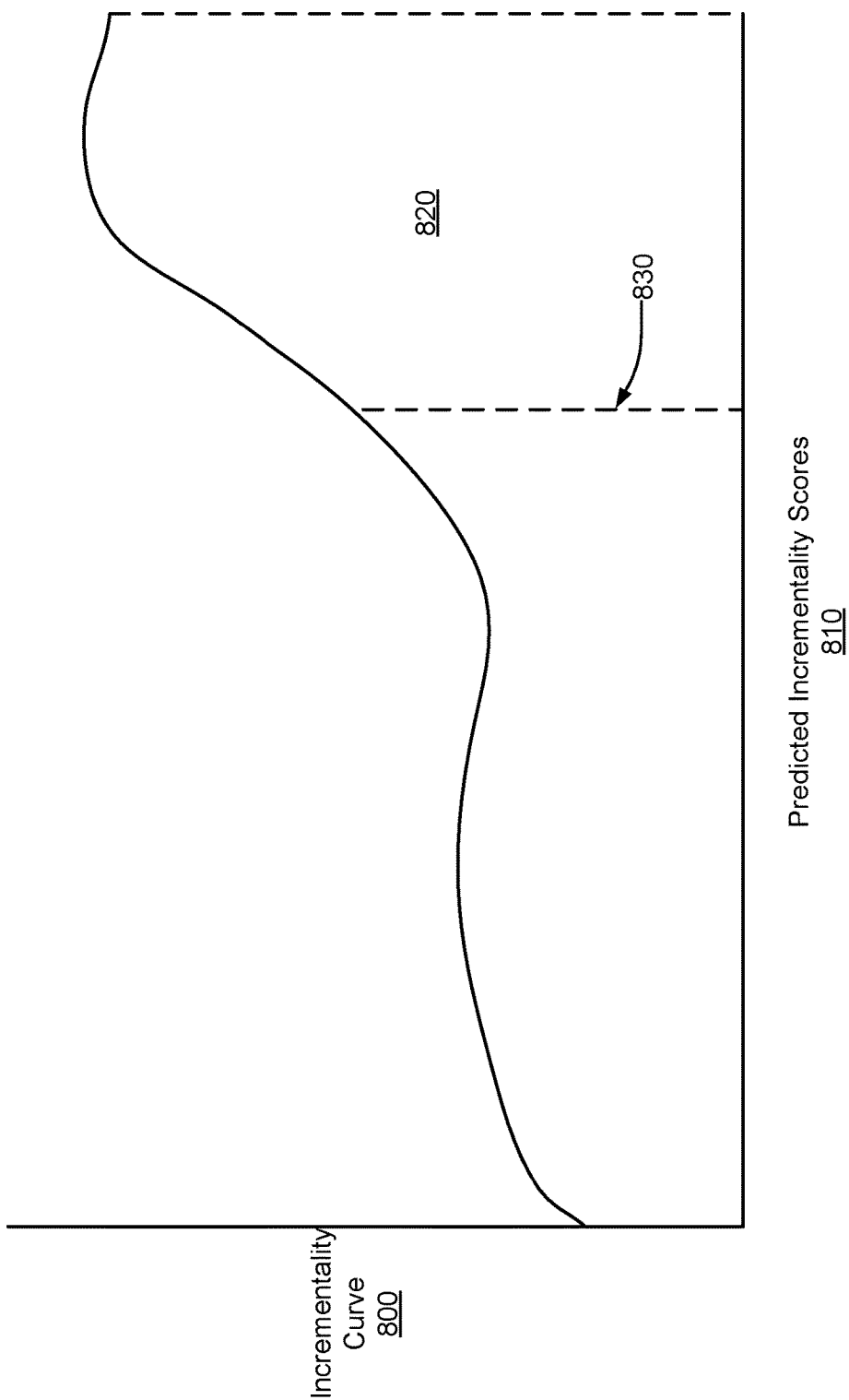
FIG. 8 illustrates an example incrementality curve for some set of predicted incrementality scores for a set of examples, in accordance with some embodiments.

The cumulative incrementality module iteratively computes 440 cumulative incrementality scores for the groupings. The cumulative incrementality module iterates over the generated groupings from the grouping with the highest ranked examples to the grouping with the lowest ranked examples. For each grouping, the cumulative incrementality module computes a cumulative incrementality score. A cumulative incrementality score is a score that represents an area under an incrementality curve for some section of the incrementality curve. The incrementality curve is a curve that represents a theoretical true incrementality for a user being treated based on predicted incrementality scores. FIG. 8 illustrates an example incrementality curve 800 for some set of predicted incrementality scores 810 for a set of examples, in accordance with some embodiments.

A cumulative incrementality score represents the area 820 of the incrementality curve above some threshold predicted incrementality score 830. By computing the area 820 under the curve above the threshold predicted incrementality score, the cumulative incrementality score focuses on the right portion of the incrementality curve 800, and thus evaluates an incrementality model's performance in identifying users for whom applying a treatment will most likely cause the user to perform the target action.

In some embodiments, the cumulative incrementality score is computed based on a ratio of ratios. The first ratio may be the ratio of the number of treated, acted examples to the number of all treated examples, and the second ratio may be the ratio of the number of untreated, acted examples to the number of all untreated examples. Thus, the cumulative incrementality score may be computed, for a set of examples, with the following formula:

$$CIS = \frac{E_{T,A}/E_{T,All}}{E_{UT,A}/E_{UT,All}}$$

where CIS is the cumulative incrementality score, $E_{T,A}$ is the number of treated, acted examples, $E_{T,All}$ is the number of treated examples, $E_{UT,A}$ is the number of untreated, acted examples, and $E_{T,All}$ is the number of untreated examples. This formula may also be rewritten as follows:

$$CIS = \frac{E_{T,A}/E_{T,All}}{1 - (E_{UT,UA}/E_{UT,All})}$$

where $E_{UT,UA}$ is the number of untreated, unacted examples.

As the cumulative incrementality module iterates through the groupings, the cumulative incrementality module computes the cumulative incrementality score based on the examples in each grouping. The cumulative incrementality module may compute the cumulative incrementality score for a grouping based on the examples in the grouping and the examples in all previous groupings with examples with higher predicted incrementality scores than those in the grouping. Thus, for example, the cumulative incrementality module may compute the cumulative incrementality score for the first grouping based on the examples in the first grouping, and may compute the cumulative incrementality score for the second grouping based on the examples in the first and second groupings.

In some embodiments, the cumulative incrementality module computes 450 a final cumulative incrementality score for the incrementality model based on the iterative cumulative incrementality scores. For example, the cumulative incrementality module may use the cumulative incrementality score computed on the final iteration as the cumulative incrementality score for the incrementality model. Alternatively, the cumulative incrementality module may use the sum, product, average, or weighted average of the iterative cumulative incrementality scores to compute the final cumulative incrementality score for the incrementality model. The cumulative incrementality module may store the final cumulative incrementality score for the incrementality model along with the incrementality model. In some embodiments, the cumulative incrementality model stores the cumulative incrementality scores computed for each grouping of examples with the incrementality model, in association with the threshold predicted incrementality score used to compute each cumulative incrementality score.

Figure 5:
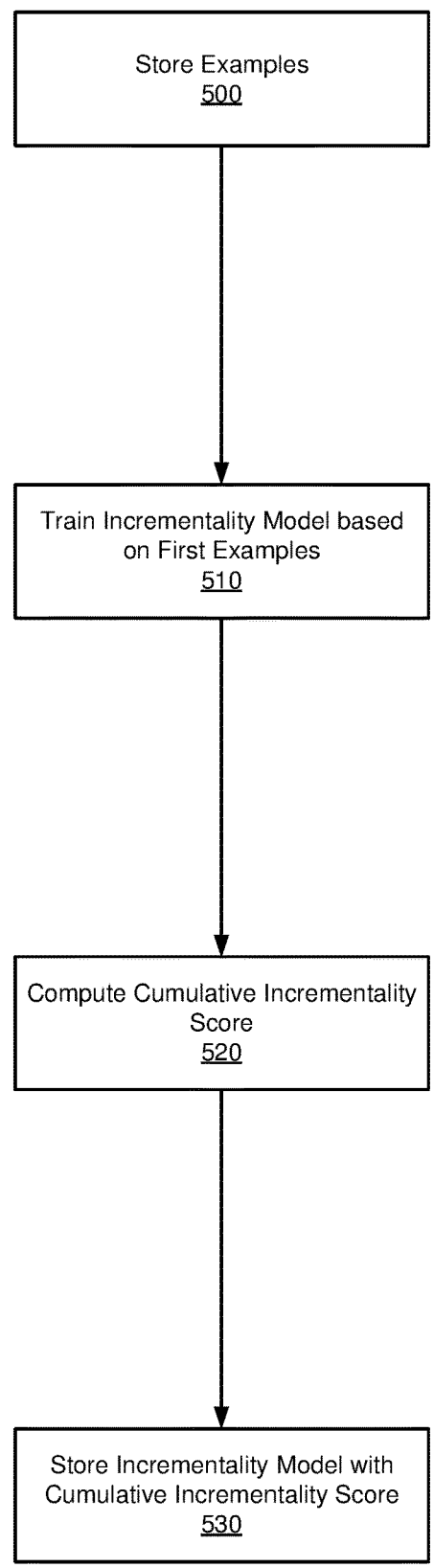
FIG. 5 is a flowchart illustrating a method of training and modifying an incrementality model based on a cumulative incrementality score, in accordance with some embodiments.

FIG. 5 is a flowchart illustrating a method of training and modifying an incrementality model, in accordance with some embodiments. Alternative embodiments may include more, fewer, or different steps from those illustrated in FIG. 5, or may perform the steps in a different order from that illustrated. Additionally, the steps may be performed automatically by a cumulative incrementality module of a computer system (such as the cumulative incrementality module 218 of FIG. 2) with or without human interaction or instruction.

The cumulative incrementality module stores 500 examples for training the incrementality model. Each example contains user data describing characteristics of a user of the online system, and each example includes a treatment label and an action label.

The cumulative incrementality module trains 510 the incrementality model based on the stored examples. For example, the cumulative incrementality module may train the incrementality model in accordance with the method described by FIG. 7. The cumulative incrementality module computes 520 a cumulative incrementality score for the incrementality model. The cumulative incrementality score is a score that represents an area under an incrementality curve for the incrementality model for some section of the incrementality model. The cumulative incrementality module may compute the cumulative incrementality score based on the stored examples, or may compute the cumulative incrementality score based on a different set of examples.

The cumulative incrementality module may compute a set of cumulative incrementality scores for the incrementality model. For example, the cumulative incrementality module may compute a cumulative incrementality score for each of a set of threshold predicted incrementality scores. These threshold predicted incrementality scores may correspond to groupings of examples for which the cumulative incrementality module iteratively computed a cumulative incrementality score, as described in FIG. 4. Similarly, the threshold predicted incrementality scores may correspond to percentiles of predicted incrementality scores generated by the incrementality model when applied to examples used to compute the cumulative incrementality scores (e.g., step 410 of FIG. 4). For example, the threshold predicted incrementality scores may correspond to the top 5%, 10%, 15%, and 20% of predicted incrementality scores generated by the incrementality model. The cumulative incrementality module may thereby compute a set of cumulative incrementality scores that are computed based on threshold predicted incrementality scores that correspond to these percentiles.

The cumulative incrementality module stores 530 the incrementality model along with the cumulative incrementality score or scores. The cumulative incrementality module may store the cumulative incrementality score with the incrementality model with an indication that the cumulative incrementality score corresponds to the incrementality model (e.g., an identifier of the incrementality model). Additionally, where the cumulative incrementality module computes a set of cumulative incrementality scores for the incrementality model, the cumulative incrementality module may store the threshold predicted incrementality scores or the percentiles that correspond to the set of cumulative incrementality scores.

In some embodiments, the cumulative incrementality module may modify the incrementality model based on the cumulative incrementality score. For example, where the incrementality model is a neural network, the incrementality model may be modified by adding or modifying neural network layers, or by adding or modifying networks within the incrementality model. Similarly, the incrementality model may be modified to include or rely on different features of the user data to compute the predicted incrementality score. In some embodiments, if the incrementality model fails to satisfy a threshold cumulative incrementality score, the cumulative incrementality module may cease using the incrementality model and may create a new incrementality model to be trained and used instead.

The cumulative incrementality module may apply the incrementality model to user data of users of the online concierge system to generate incrementality scores for the users. The cumulative incrementality module uses the generated incrementality scores to determine whether to apply a treatment to a user. For example, the cumulative incrementality module may apply a treatment to users whose incrementality scores exceed a threshold incrementality score. Similarly, the cumulative incrementality module may rank users based on their incrementality scores and may apply a treatment to users whose incrementality scores exceed a ranking threshold.

Figure 6:
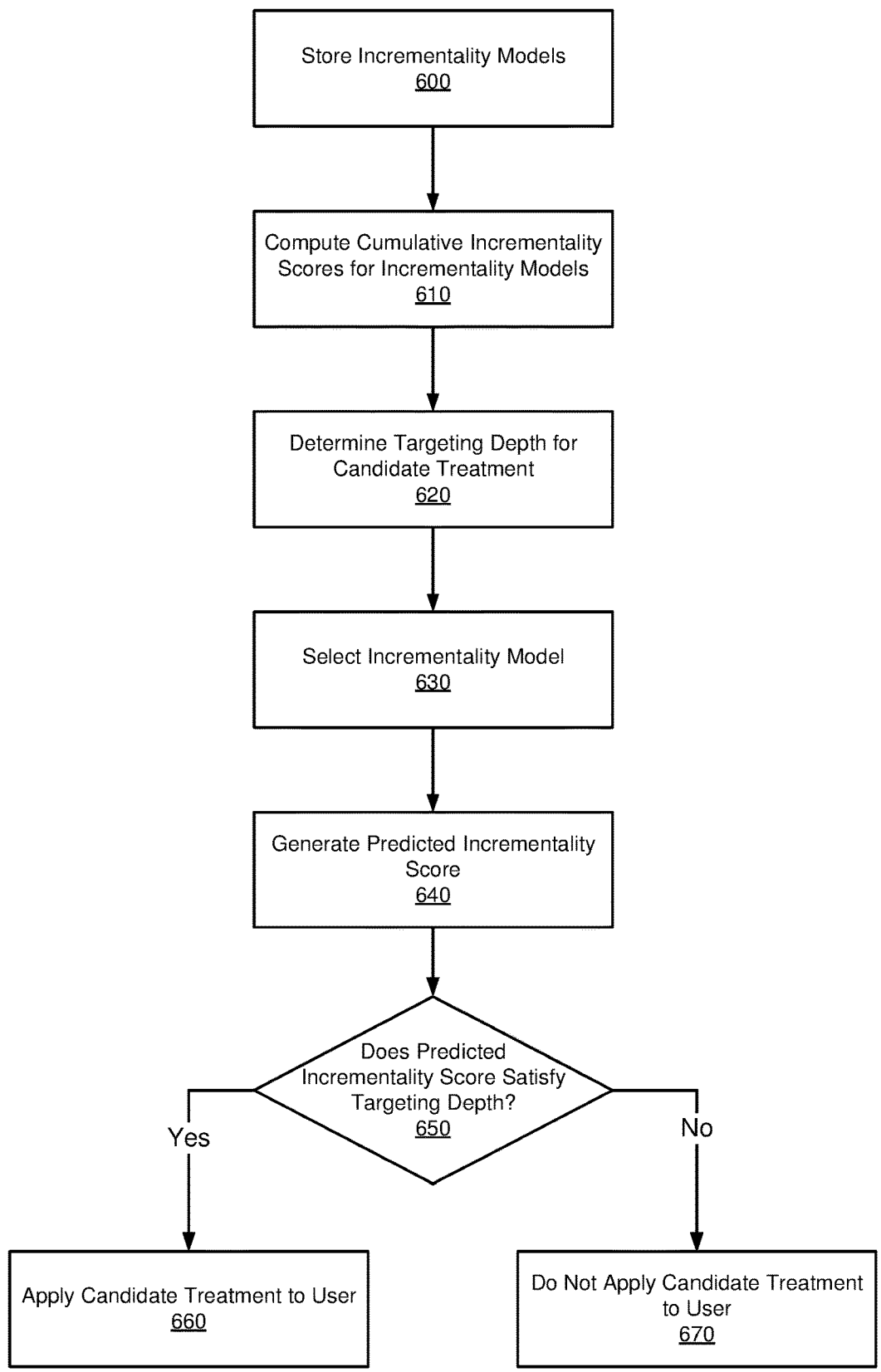
FIG. 6 is a flowchart illustrating a method for selecting an incrementality model for applying a treatment to a user, in accordance with some embodiments.

FIG. 6 is a flowchart illustrating a method for selecting an incrementality model for applying a treatment to a user, in accordance with some embodiments. Alternative embodiments may include more, fewer, or different steps from those illustrated in FIG. 6, or may perform the steps in a different order from that illustrated. Additionally, the steps may be performed automatically by a cumulative incrementality module of a computer system (such as the cumulative incrementality module 218 of FIG. 2) with or without human interaction or instruction.

The cumulative incrementality module stores 600 incrementality models. Each incrementality model is a machine learning model (e.g., a neural network) that is trained to generate predicted incrementality scores for users based on user data describing characteristics of the users. Each incrementality model may be trained to generate predicted incrementality scores through a training process, such as the one illustrated by FIG. 7.

The cumulative incrementality module computes 610 a cumulative incrementality score for each incrementality model. The cumulative incrementality module may use a final cumulative incrementality score generated by the method illustrated by FIG. 4 to compute a cumulative incrementality score for each model. The cumulative incrementality module may use the same set of examples to compute the cumulative incrementality score for each incrementality model or may use different sets of examples for the incrementality models.

The cumulative incrementality module determines 620 a targeting depth for a candidate treatment. The cumulative incrementality module may receive a candidate treatment to apply to users of the online concierge system. For example, the cumulative incrementality module may receive the candidate treatment from a third-party system. The candidate treatment may be associated with a targeting depth.

A targeting depth of a candidate treatment is an indication of how many users the candidate treatment should be applied to. The targeting depth may indicate a number of users, a percentage of overall users of the online concierge system, or a threshold likelihood that a user will perform a target action in response to being treated with the candidate treatment.

The cumulative incrementality module selects 630 an incrementality model for targeting users with the candidate treatment based on the cumulative incrementality scores for the incrementality models and the targeting depth. The cumulative incrementality module may select the incrementality model that best identifies users that are within the targeting depth. For example, say the targeting depth for a candidate treatment is to target the top 15% of users who see the largest increase in likelihood of performing a target action in response to being treated with the candidate treatment. The cumulative incrementality module may compare the cumulative incrementality scores for each of the incrementality models to identify the incrementality model that best predicts the top 15% of users.

In some embodiments, the cumulative incrementality module compares cumulative incrementality scores generated based on examples within the targeting depth for each incrementality model. For example, as described with regards to FIG. 4, the cumulative incrementality module may rank examples based on predicted incrementality scores generated by an incrementality model. The cumulative incrementality module may compute a cumulative incrementality score using examples that are ranked within the targeting depth. For example, if the targeting depth is to target the top 15% of users, the cumulative incrementality module may compute a cumulative incrementality score for an incrementality model based on the top 15% of the ranked examples for the incrementality model. The cumulative incrementality module may use these cumulative incrementality scores to select an incrementality model, such as by selecting the incrementality model with the highest cumulative incrementality score.

In some embodiments, the cumulative incrementality module determines a threshold predicted incrementality score for each incrementality model that corresponds to the targeting depth, and selects which incrementality model to use based on a cumulative incrementality score for each incrementality model based on the determined threshold predicted incrementality score. For example, for a targeting depth that targets the top 15% of users, the cumulative incrementality module may determine a threshold predicted incrementality score for each incrementality model that corresponds to the top 15% of users. The cumulative incrementality module computes a cumulative incrementality score for each incrementality model based on their respective determined threshold predicted incrementality score, and the cumulative incrementality module may select an incrementality model based on the cumulative incrementality scores for the incrementality models.

The cumulative incrementality module uses the selected incrementality model to generate 640 predicted incrementality scores for a set of users based on user data describing each of the users. The cumulative incrementality module may apply the selected incrementality model to user data for a set of candidate users, and may determine 650 whether the generated predicted incrementality score for each user satisfies the targeting depth for the candidate treatment. If a user's predicted incrementality score satisfies a targeting depth for the candidate treatment (e.g., is in the top 15% of predicted incrementality scores), the cumulative incrementality module applies 660 the candidate treatment to the user. If the user's predicted incrementality score does not satisfy the targeting depth, the cumulative incrementality module does not apply 670 the candidate treatment to the user. In some embodiments, the cumulative incrementality module applies a different treatment to the user.

Figure 7:
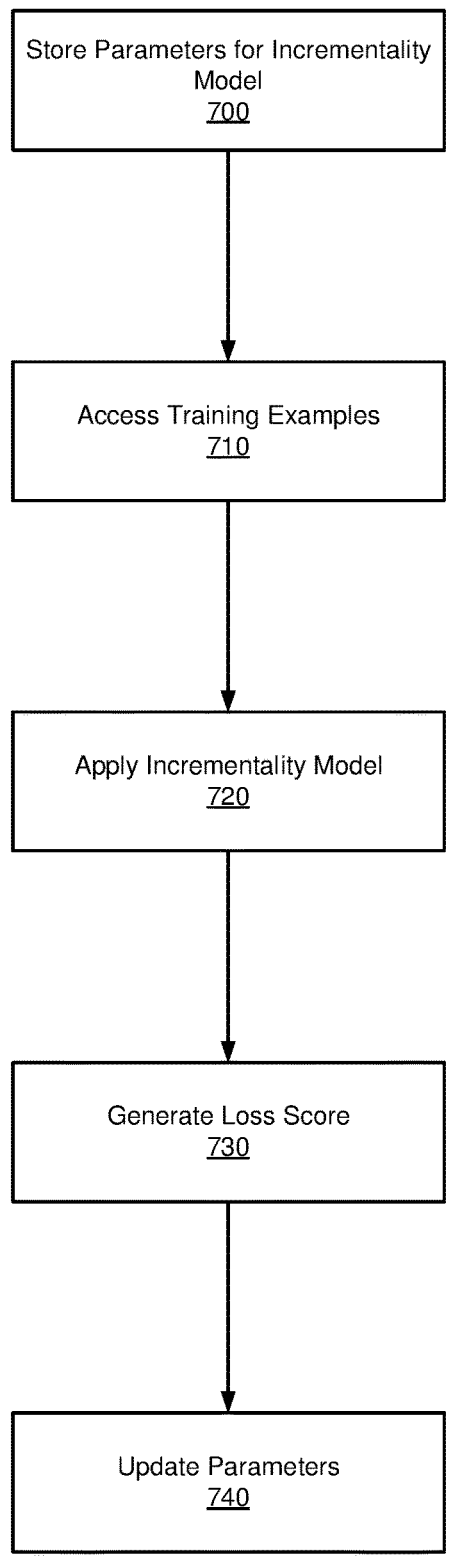
FIG. 7 is a flowchart illustrating a method for training an incrementality model, in accordance with some embodiments.

FIG. 7 is a flowchart illustrating a method for training an incrementality model, in accordance with some embodiments. Alternative embodiments may include more, fewer, or different steps from those illustrated in FIG. 7, or may perform the steps in a different order from that illustrated. Additionally, the steps may be performed automatically by a cumulative incrementality module of a computer system (such as the cumulative incrementality module 218 of FIG. 2) with or without human interaction or instruction.

The cumulative incrementality module stores 700 parameters for an incrementality model. These parameters may be weights used by one or more machine learning models (e.g., a linear regression, a logistic regression, a neural network) that make up the incrementality model. The parameters may be initial parameters that reflect an untrained incrementality model, or may be previously trained parameters.

The cumulative incrementality module accesses 710 a set of training examples for training the incrementality model. The training examples each contain user data describing characteristics of a user of the online system, and each include a treatment label for a candidate treatment and an action label for a target action of the candidate treatment. In some embodiments, each training example includes information describing the treatment associated with the training example. For example, the training example may describe a type of the treatment, what parameters are used for the treatment (e.g., the magnitude of a discount for the treatment), or other information relevant to the application of the treatment to a user. The cumulative incrementality module trains the incrementality model by applying 720 the incrementality model to the user data of each training example. The incrementality model generates a predicted incrementality score for each training example.

The cumulative incrementality module generates 730 a loss score by applying a loss function to the predicted incrementality score, the treatment label of the training example, and the action label of the training example. The loss function is a loss function that optimizes the incrementality model to classify whether a user is a member of a target class of users. The target class of users that the loss function optimizes for are users who (a) have been treated with the candidate treatment and have performed the target action associated with the candidate treatment, or (b) have not been treated with the candidate treatment and have not performed the target action associated with the candidate treatment. The loss function indicates that the incrementality model has performed well if the incrementality model correctly identifies whether users are within that class, and indicates that the incrementality model has performed poorly if the incrementality model fails to correctly identify whether users are within that class.

By training the incrementality model as a classifier to identify users within the target class, the predicted incrementality scores generated by the incrementality model identify users for whom applying the candidate treatment will be most likely to incentivize or cause the user to perform the target action. The incrementality model is not only trained to identify users within the target class, but the incrementality model is also thereby inherently trained to identify users that are not within the target class. These users that are not in the target class are users that (a) have not been treated with the candidate treatment but have performed the target action, or (b) users that have been treated with the candidate treatment but have not performed the target action. The online concierge system is not benefited by applying the candidate treatment to either of these types of users. In the first case, the users have performed the target action anyways without being treated, thus applying the candidate treatment would not cause the user to perform the target action. In the second case, the users did not perform the target action, even though they have been treated with the candidate treatment. Thus, users that are not in the target class will either perform or not perform the target action, regardless of treatment, meaning the online concierge system is not benefited by applying the candidate treatment to these users. Therefore, by training the incrementality model to generate predicted incrementality scores that identify whether a user is in the target class, the incrementality model identifies users which are most likely to be influenced by the candidate treatment being applied to them.

The cumulative incrementality module updates 740 the parameters for the incrementality model based on the loss score generated by the loss function. The cumulative incrementality module may use a backpropagation process to update the parameters based on the loss score. The cumulative incrementality module may store these updated parameters on a computer-readable medium to be used for applying the incrementality model to user data.

Other Considerations

The foregoing description of the embodiments has been presented for the purpose of illustration; it is not intended to be exhaustive or to limit the patent rights to the precise pages disclosed. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The weights may be stored on one or more computer-readable media, and are used by a system when applying the machine learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A method comprising:
   at a computer system comprising at least one processor and memory:
   storing a first plurality of examples representing interactions with an online system by a first plurality of users, wherein each example of the first plurality of examples comprises: user data describing characteristics of a user of the first plurality of users, a treatment label indicating whether the user has been treated with a treatment, and an action label indicating whether the user performed a target action associated with the treatment;
   training an incrementality model using the first plurality of examples, wherein the incrementality model is a machine-learning model trained to generate predicted incrementality scores for users based on user data, and wherein a predicted incrementality score for a user is a score representing a likelihood that the treatment will cause the user to perform the target action;
   computing a cumulative incrementality score for the incrementality model based on a second plurality of examples, wherein the cumulative incrementality score represents a section of an incrementality curve above a threshold predicted incrementality score, and wherein each example of the second plurality of examples comprises: user data describing characteristics of a user of a second plurality of users, a treatment label indicating whether the user has been treated with a treatment, and an action label indicating whether the user performed a target action associated with the treatment; and
   storing the incrementality model and the cumulative incrementality score for the incrementality model.

2. The method of claim 1, wherein training the incrementality model based on the first plurality of examples comprises training the incrementality model to select for a first set of examples in which users were treated and performed the target action and to select for a second set of examples in which user were not treated and did not perform the target action.

3. The method of claim 2, wherein training the incrementality model based on the first plurality of examples comprises training the incrementality model to select against a third set of examples in which a user was treated and did not perform the target action and to select against a fourth set of examples in which a user has not been treated and performed the target action.

4. The method of claim 3, wherein training the incrementality model based on the first plurality of examples comprises training the incrementality model as a classifier to identify users in a target class of users, wherein the target class of users comprises:
   users who were treated and performed the target action; and
   users who were not treated and did not perform the target action.

5. The method of claim 1, wherein computing the cumulative incrementality score for the incrementality model comprises:
   applying the incrementality model to each example of the first plurality of examples to generate a predicted incrementality score for each example of the first plurality of examples;
   generating a plurality of groupings based on the first plurality of examples, where each grouping of the plurality of groupings comprises a subset of the first plurality of examples within a range of predicted incrementality scores; and;
   computing a cumulative incrementality score for each grouping based on examples within each grouping.

6. The method of claim 5, further comprising:
   ranking the plurality of groupings based on the range of predicted incrementality scores of each grouping; and
   computing the cumulative incrementality score for each grouping of the plurality of groupings based on examples in the grouping and examples in groupings of the plurality of groupings with higher predicted incrementality scores than the grouping.

7. The method of claim 6, further comprising:
   computing a final cumulative incrementality score based on the cumulative incrementality score for each grouping of the plurality of groupings.

8. The method of claim 1, wherein computing the cumulative incrementality score comprises:
   computing a first ratio of:

a number of examples in which a user was treated and performed the target action to a number of examples in which a user was treated;
computing a second ratio of:
a number of examples in which a user was not treated and performed the target action to a number of examples in which a user was not treated; and
computing the cumulative incrementality scores based on a third ratio of the first ratio to the second ratio.

9. The method of claim 1, wherein applying the treatment to a subject user comprises:
receiving a targeting depth for the treatment, wherein the targeting depth comprises an indication of which users to target with the treatment; and
selecting a set of users to treat based on the targeting depth and the cumulative incrementality score for the incrementality model.

10. The method of claim 1, further comprising:
applying the treatment to a subject user by applying the incrementality model to user data describing characteristics of the subject user.

11. The method of claim 1, further comprising:
computing a plurality of cumulative incrementality scores for the incrementality model based on the second plurality of examples, wherein each cumulative incrementality score of the plurality of cumulative incrementality scores is computed based on a different threshold predicted incrementality score; and
storing the plurality of cumulative incrementality scores.

12. A method comprising:
at a computer system comprising at least one processor and memory:
training a plurality of incrementality models, wherein each incrementality model is trained to generate a predicted incrementality score for a user based on user data describing characteristics of a user, wherein a predicted incrementality score represents a likelihood that applying a candidate treatment to a user will cause the user to perform a target action associated with the candidate treatment;
computing a set of cumulative incrementality scores for each incrementality model of the plurality of incrementality models, wherein a cumulative incrementality score for an incrementality model represents an area of a section of an incrementality curve above a threshold predicted incrementality score, and wherein each cumulative incrementality score in a set of cumulative incrementality scores for an incrementality model is associated with a different threshold predicted incrementality score;
determining a targeting depth for the candidate treatment;
selecting an incrementality model of the plurality of incrementality models based on the targeting depth and the set of cumulative incrementality scores of the each of the plurality of incrementality models;
generating a predicted incrementality score for a viewing user by applying the selected incrementality model to user data describing characteristics of the viewing user; and
applying the candidate treatment to the viewing user based on the predicted incrementality score.

13. The method of claim 12, wherein applying the candidate treatment to the viewing user comprises:
transmitting instructions to a client device of the user to display a notification to the user.

14. The method of claim 12, wherein training the plurality of incrementality models comprises training the plurality of incrementality models to classify whether a user is likely to be a member of a class of users, wherein the class of users is defined as:
users who have been treated with a treatment and have performed a target action; and
users who have not been treated with a treatment and have not performed a target action.

15. The method of claim 12, wherein selecting an incrementality model of the plurality of incrementality models comprises:
determining a threshold predicted incrementality score for each incrementality model that corresponds to the targeting depth; and
selecting the incrementality model of the plurality of incrementality models based on cumulative incrementality scores for the plurality of incrementality models that correspond to the determined threshold predicted incrementality scores.

16. The method of claim 15, wherein selecting the incrementality model comprises:
identifying an incrementality model of the plurality of incrementality models associated with a highest cumulative incrementality score corresponding to the determined threshold predicted incrementality scores.

17. The method of claim 12, further comprising:
receiving the targeting depth from a third-party system.

18. The method of claim 12, wherein computing a cumulative incrementality score for an incrementality model of the plurality of incrementality models comprises:
applying the incrementality model to each example of a plurality of examples to generate a predicted incrementality score for each example of the plurality of examples;
generating a plurality of groupings based on the plurality of examples, where each grouping of the plurality of groupings comprises a subset of the plurality of examples within a range of predicted incrementality scores; and;
computing a cumulative incrementality score for each grouping based on examples within each grouping.

19. The method of claim 18, further comprising:
ranking the plurality of groupings based on the range of predicted incrementality scores of each grouping; and
computing the cumulative incrementality score for each grouping of the plurality of groupings based on examples in the grouping and examples in groupings of the plurality of groupings with higher predicted incrementality scores.

20. A non-transitory computer-readable medium storing a set of parameters for a machine learning model, wherein the set of parameters are generated by a process comprising:
storing the set of parameters;
accessing a set of training examples at an online concierge system, where each training example in the set of training examples comprises:
user data describing characteristics of a user;
a treatment label indicating whether the user has been treated with a treatment; and
an action label indicating whether the user has performed a target action associated with the treatment; and
for each training example in the set of training examples:
applying the machine learning model to the user data of the training example to generate a predicted incrementality score, wherein the predicted incrementality score represents a likelihood that the user will perform a target action on the online concierge system;

generating a loss score by applying a loss function to the predicted incrementality score, the treatment label, and the action label, wherein the loss function optimizes the machine learning model to predict whether a user is a member of a class of users, wherein the class of users comprises:

users who have been treated with the treatment and have performed the target action; and users who have not been treated with the treatment and have not performed the target action; and updating the set of parameters based on the loss score.

* * * * *